W. H. HENNAH & A. K. W. RISSEL.
MEANS FOR INDICATING A SHIP'S DEVIATIONS FROM ITS COURSE.
APPLICATION FILED AUG. 7, 1909.
994,677.
Patented June 6, 1911.
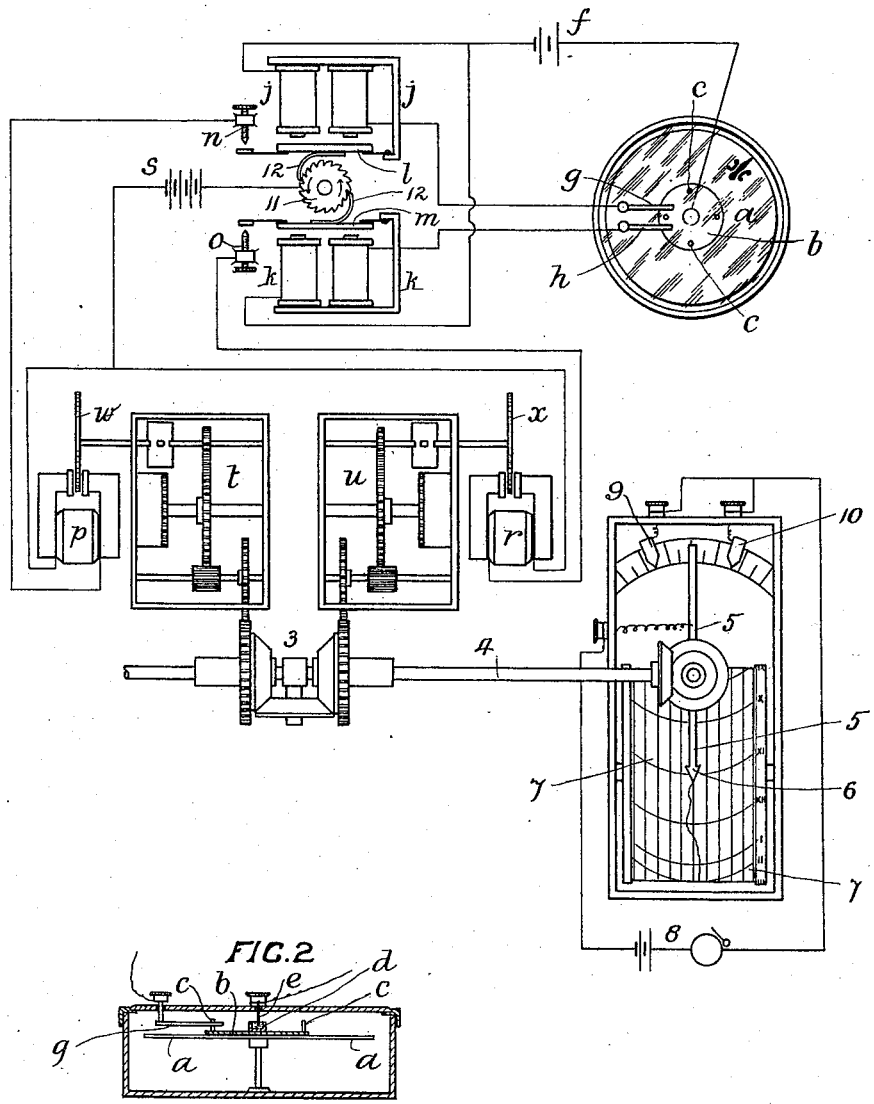
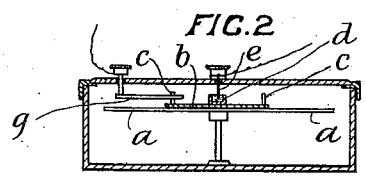
INVENTORS,
WILLIAM HENRY HENNAH and
AUGUSTE KERR WAITANGI RISSEL,
by
Attorney.

UNITED STATES PATENT OFFICE.

WILLIAM HENRY HENNAH AND AUGUSTE KERR WAITANGI RISSEL, OF WELLINGTON, NEW ZEALAND.

MEANS FOR INDICATING A SHIP'S DEVIATIONS FROM ITS COURSE.

994,677. Specification of Letters Patent. Patented June 6, 1911.

Application filed August 7, 1909. Serial No. 511,806.

*To all whom it may concern:*

Be it known that we, WILLIAM HENRY HENNAH and AUGUSTE KERR WAITANGI RISSEL, subjects of the King of Great Britain, residing at Wellington, New Zealand, have invented a new and useful Improved Means for Indicating a Ship's Deviations from Its Course; and we do hereby declare the following to be a full, clear, and exact description of the same.

This invention relates to means that have been devised for the purpose of indicating the deviations of a ship from the course set, and for sounding an alarm when the deviation has extended for a predetermined period of time, or when a number of deviations to the one side have aggregated, in the time taken up, such predetermined period. The means designed for this purpose depend for their action upon the swing of a compass card relatively to the compass bowl and vessel, when the ship's course alters, or in other words, to the movement of the compass bowl around the compass card as the vessel alters her course. This movement of the compass bowl is used to close one or other of two electric circuits that are both open when the card is in a central position, but which, as the bowl moves around toward one side or other, will close the corresponding circuit in a manner already well known in connection with this class of appliance. In this invention, each of these circuits when closed is arranged to actuate a relay by means of which a separate secondary magnetic circuit is completed. The completion of either of these magnetic circuits causes a stylus or other like device to move transversely across a rotating or traveling strip of paper to one side or the other of a central line drawn along it, and in a direction corresponding to the movement of the ship from the course. The movement of this stylus for a predetermined distance in either direction is adapted to close an alarm circuit and thereby to notify those interested that the ship has swung from its course.

In fully describing the invention, reference will be made to the accompanying sheet of drawings, which illustrate the approved form of apparatus for carrying out the invention, but mainly in diagrammatic form.

In such drawings,—Figure 1 is a view of the whole apparatus employed. Fig. 2 is a sectional elevation of a compass and the attachments for closing the relay circuits in the manner described.

In the means shown, the compass card $a$ is provided with a light metallic disk $b$ on its upper side from which a number (preferably four) of metal pegs $c$ project upward arranged at regular intervals apart. A small cup $d$ is attached to the center of the disk and filled with mercury. A wire $e$ passes down through the center of the compass cover, and dips into the mercury in the cup $d$. This wire is attached to a terminal to which one pole of a battery $f$ is connected. A pair of metallic arms $g$, $h$, are connected to the lower ends of small vertical rods passing down through the compass cover, so that these arms may be turned to lie one on each side of any one of the pegs $c$, and at any desired distance away therefrom. A pair of relays $j$, $k$, are respectively arranged in electric circuit with these arms $g$, $h$, and both relays are connected by a common return with the other pole of the battery $f$. Thus, should the vessel swing to one side or other, and thereby cause the compass bowl to move in relation to the card $a$, the corresponding arm $g$ or $h$ will be caused to engage with the peg $c$, and thereby close the circuit through the respective relay $j$ or $k$. Each of these relays is provided with spring armature $l$, $m$, which armatures, as they are drawn into engagement with the respective relays, engage with adjustable terminals $n$, $o$. Placed in circuit with each of these terminals is an electromagnet $p, r$, and both of such magnets are connected by a common return with one pole of a battery $s$, the other pole of which is connected with both armatures $l$—$m$. Thus, should the compass swing and cause the arm $g$ to make contact with the peg $c$, the relay $j$ will be energized, and the armature $l$ drawn into contact with the terminal $n$, and thus close the circuit through the magnet $p$ to energize such magnet. In like manner, the magnet $r$ will be energized upon the arm $h$ making contact with the peg $c$.

Arranged adjacent to each magnet $p$—$r$ is suitable clock or spring actuated gearing $t$—$u$ which is kept in continuous action, and each of which is controlled by a controlling fan in the well known way. The fan spindle of each of these sets of clock work is provided with a metallic disk $w$—$x$— on its end, which disk is arranged to rotate between the poles of the corresponding electromagnet $p$ or $r$. The energizing of one of these magnets will thereby cause it to act upon this disk, and stop the corresponding clockwork from rotation, so that by the swing of the vessel in one direction, the clockwork $t$ will be stopped, while the swing in the other direction will cause the clockwork $u$ to be stopped. The two clockworks are arranged to respectively actuate the outer wheels of an epicyclic train of wheels (3) adapted to impart reverse motion to a spindle (4) in the well known way, as either of such wheels is retarded from revolution. This spindle is geared to a pivoted arm (5) so that by the movements of the spindle, the arm will be caused to swing in a corresponding direction. The end of the arm carries a stylus or other suitable marking device (6) which is arranged to press lightly upon the periphery of a rotating drum (7). This drum is caused to rotate at any desired rate of speed, and is covered by a strip of paper or the like, divided transversely into divisions of time corresponding to the rate of rotation of the drum, and longitudinally with divisional lines on each side of a central line corresponding to divisions of time of relatively less periods. The movements of the arm (5) will thus be recorded on the surface of this strip.

Upon the ship's course being set, the compass case is turned until the arms $g$—$h$ lie one on each side of one of the pegs $c$ and the stylus (6) arranged upon the central line of the recording strip. Then, should the strip deviate from that course, a movement in the corresponding direction will be imparted to the stylus, so that it will move transversely across the strip and mark thereon, thus indicating the time at which the deviation occurred, and the length of deviation. Should the vessel's head then be swung into line with the course again, this travel of the stylus will stop, so that as the strip moves beneath it, the stylus will record thereon a mark that is parallel to the central line, thus indicating that, though apparently still on its course, the vessel is actually parallel thereto. To bring the stylus back again to the center line, it will be necessary to deviate to the other side an equal amount, and thereby bring the vessel back on to the true course. Thus an accurate record will be made of the vessel's movements in respect to the course set.

In order to provide for the sounding of an alarm upon the deviations to one side reaching a certain amount or extending over a fixed period of time, the arm (5) is connected with one pole of an alarm circuit (8) while a pair of adjustable contact blocks (9) and (10) are connected to the other pole of such circuit. These blocks are arranged one upon each side of the arm (5), and are each adapted to be engaged by such arm (which is made of suitable conductor material) as it moves to the corresponding side under the influence of the ship's deviation and thereby to complete the alarm circuit. By adjusting the position of these contact blocks in conjunction with the known rate of transverse movement to be given the arm by the operating clockwork, it will be possible to allow for the deviations extending for any desired fixed period of time before the alarm is sounded.

In order to insure that the armatures $l$ and $m$ shall remain in contact with their respective terminals $n$ and $o$ a sufficient length of time to provide for the recording arm being actuated upon each deviation of the ship, a small notched or ratcheted wheel (11) is arranged between both armatures and caused to revolve in the direction of the arrows, at a fixed rate of speed. Connected to each armature is a bow spring (12) which engages with the periphery of the wheel in such a manner that the wheel, in its rotation, will pass beneath such springs. When an armature is drawn in to make contact, its spring will slip over a certain number of the teeth, so that by the engagement of such spring with the wheel, the armature will be prevented from moving out again until the wheel by traveling around, allows it. In the drawings, this wheel is shown as acting as the terminal for connecting the armatures $l$ and $m$ with the battery $s$.

By adjusting the contact arms $g$ and $h$ of the compass the amount of swing or degree of deviation to be allowed the vessel without actuating the recorder arm, may be regulated at will. Thus, provision may be made for close sailing on the one side, and wide sailing on the other. When the appliances are not required to record, the two arms $g$ and $h$ may be swung right out of the line of movement of the pins $c$ on the compass card.

What we do claim as our invention, and desire to secure by Letters Patent, is—

1. In means for indicating a ship's deviations from its course, in combination, a mariner's compass, two electric relay circuits, means upon the compass to separately close the respective relay circuits, an armature for each relay, a spring tooth upon such armature, a rotating ratchet wheel mounted adjacent to the armature and with which the spring tooth engages, a separate secondary circuit adapted to be closed by the movement of each relay armature, an electromagnet placed within each secondary circuit, a recording stylus arranged for engagement with a record strip, means for causing such stylus to move across such a strip and adapted to be actuated in reverse directions by the energizing of the respective electromagnets, substantially as specified.

2. In means for indicating a ship's deviations from its course, in combination, a recording stylus arranged for engagement with a record strip, two sets of spring actuated mechanism adapted to move the stylus in reverse directions, a pair of electromagnets arranged adjacent to the respective sets of spring actuated mechanism and adapted when energized to check the movement thereof, secondary electric circuits adapted, when closed, to energize the respective electromagnets, a pair of relay circuits adapted to close the respective secondary circuits, a mariner's compass and means on the compass to separately close the respective relay circuits, substantially as specified.

3. In means for indicating a ship's deviations from its course, in combination, a mariner's compass, two electric relay circuits, means upon the compass to close the respective relay circuits, a recording stylus arranged for engagement with a record strip, adapted to be reversely moved across such a strip by the closing of the respective relay circuits, and an electric alarm circuit adapted to be closed by such movements of the stylus, substantially as specified.

In testimony whereof, we have signed this specification in the presence of two subscribing witnesses.

WILLIAM HENRY HENNAH.
AUGUSTE KERR WAITANGI RISSEL.

Witnesses:
W. ALEXANDER,
WILMOT BORLASE.

---

Copies of this patent may be obtained for five cents each, by addressing the "Commissioner of Patents, Washington, D. C."